Oct. 3, 1961
H. FLASCH
3,002,846
PROCESS FOR THE MANUFACTURE OF INORGANIC PIGMENTS
Filed July 2, 1957
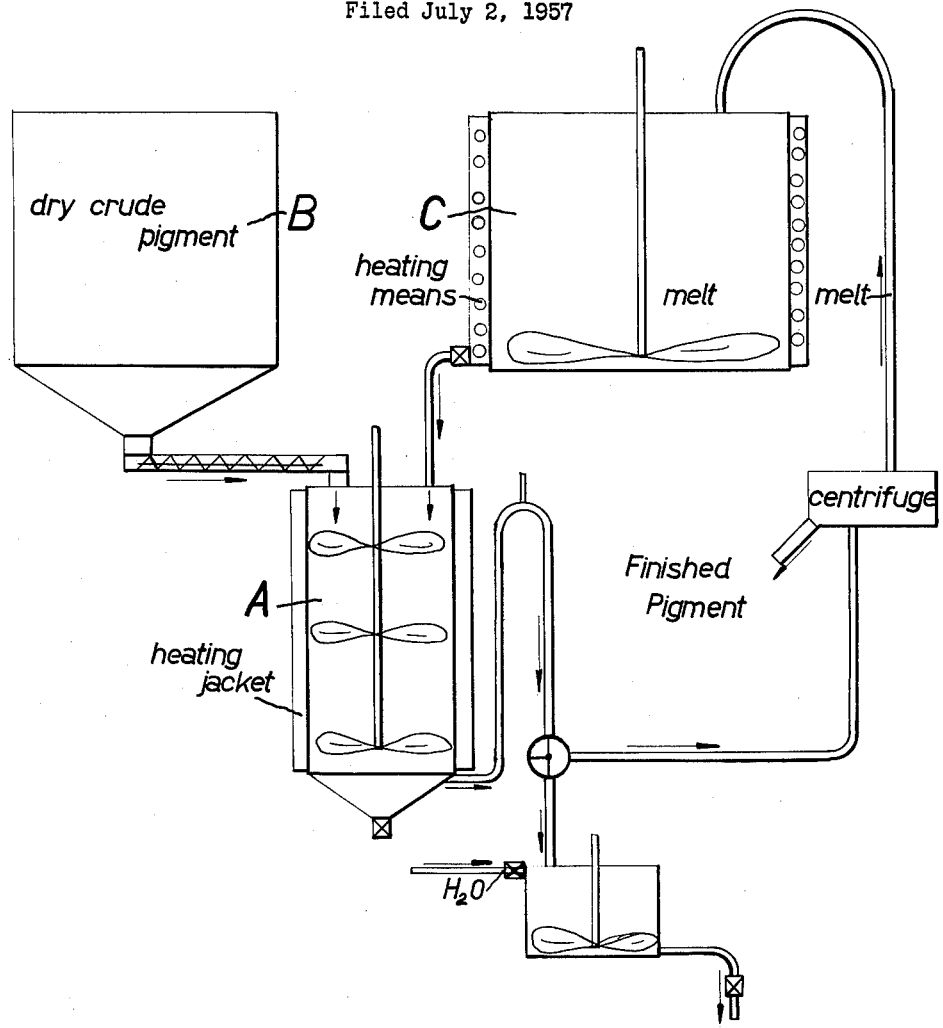
INVENTOR.
HELMUT FLASCH
BY Burgess, Dinklage & Sprung
ATTORNEYS

United States Patent Office 3,002,846
Patented Oct. 3, 1961

3,002,846
PROCESS FOR THE MANUFACTURE OF
INORGANIC PIGMENTS
Helmut Flasch, Leverkusen, Germany, assignor to Farbenfabriken Bayer Aktiengesellschaft, Leverkusen, Germany, a corporation of Germany
Filed July 2, 1957, Ser. No. 669,631
Claims priority, application Germany July 2, 1956
5 Claims. (Cl. 106—309)

Many inorganic white and coloured pigments must be subjected, after the production of the crude pigments, which is more especially effected by precipitation from aqueous solutions, to a grain-ripening process by heat treatment for the purpose of developing the characteristic pigment properties. This calcination of the precipitated crude pigments is generally carried out at the present time by dry heating in rotary tube furnaces, drum-type furnaces, plate-type furnaces and hand furnaces.

Although it has been possible over the last 20 years to improve the precipitation, comminution and grading processes which precede and follow the calcination and thereby also gradually to improve the pigment properties of the colouring bodies, it has not so far been possible to eliminate the fundamental disadvantages inherent in the dry heating process. The basis of these defects is as follows:

(1) Individual pigment particles do not all experience the same heat treatment in the rotary tube, drum-type, plate-type and hand furnaces, and this heat treatment sometimes varies to a considerable degree. Consequently, some of the pigment has too coarse a grain, while other parts thereof have too fine a grain.

(2) The dry heating of the pigments leads to agglomeration or the formation of grits due to sintering.

It is true that most of the gritty constituents can be removed by subsequent grinding and grading, but attempts to break up the agglomerates have so far only been partially successful. Grinding of the pigments for too long a period has many disadvantages. For example, a loss in colour purity occurs with the sensitive cadmium red pigments.

These defects of the dry heating of pigments are the reason why the inorganic white and coloured pigments at present on the market do not have best possible pigment properties owing to their unsatisfactory grain composition, and above all they show too low a colouring power and frequently a deficiency in purity and brilliance of the colour shade.

The following processes for avoiding the defects of dry heating have become known; the first is the process for the treatment of zinc sulphide in a dilute sulphuric acid solution and the second is the process for heating pigments under pressure and in water at relatively high temperatures. It has, however, not so far been possible for this last-mentioned process to be introduced for practical use owing to the extreme difficulty of controlling the process.

This invention is concerned with a process for the manufacture of inorganic pigments, the process consisting in that the crude pigments are subjected to a heat treatment while suspended in a melt.

White and coloured pigments of hitherto unknown quality and substantially improved colouring power and brilliance can be obtained in this way. In contrast to the photographs made with an electron microscope of the prior known products, photographs of the pigments according to the invention show particularly well-formed separate crystals.

The grape-like agglomerations and sinterings to be detected in the former pigments under the electron microscope, and also the large number of ineffective or harmful particles with too small a grain size, are almost completely eliminated. A hitherto unknown crystal-like appearance is frequently to be observed with the pigments manufactured by the process of the invention. The existing results show that as a result of the heat treatment in melts, pigment properties which cannot be produced by dry heating are developed.

There is an occasional reference in the literature to the fact that the dry heating of pigments, for example of some types of lithopones, is carried out in the presence of small quantities of barium chloride or sodium chloride to lower the calcining temperatures.

However, while the pigments are suspended in a relatively large quantity of melt, which is for example three to four times that of the crude pigment, when using the process according to the invention, only 1 to 2% of NaCl or $BaCl_2$, based on pigment, are added in the aforementioned procedure in a dry heating process; the two processes are therefore fundamentally different from one another.

Moreover the known production of mineral pigments by fusion, in which the reactants in the fused mass react with one another (for example the production of ultramarine) has nothing in common with the above process in which pigments are dispersed in melts.

In the production of inorganic pigments by the novel process, it has surprisingly been established that the pigments in the melts not only reach the best possible pigment properties at lower temperatures than with dry heating, but, above all, over shorter heating times. When using the dry heating method, the heating period for the pigments is usually several hours, whereas it is often only a few minutes when heating in melts.

The apparatus required for the production of inorganic pigments by the novel process is of a simple nature and is smaller in size as compared with the prior process, owing to the fact that grinding and grading assemblies are not used. The novel process is therefore more economic than the former working method.

The technical production of the pigments by the new process is preferably carried out in a continuous flow apparatus; for example, a siphon-like heated discharge tube is provided on a heated through-flow container A which is of comparatively small dimensions and which is provided with a very efficient stirrer mechanism. Dry crude pigment is continuously supplied in measured quantities from the silo B to the said container A while the melt is supplied from another container C.

With a given output of the installation and an established temperature, the dimensions of the through-flow container A and the supply of the components are so adapted one to another as to assure the optimum length of stay of the pigments during the heat treatment.

The melt with the suspended and finally ripened pigment discharging from the siphon of the container A corresponding to the input can be worked up in various ways.

One possible technical method is to chill the melt with water. The pigment is then filtered off, washed and dried. The solution which forms is either supplied as a by-product to another manufacturing process or is concentrated by evaporation and again introduced into the process as a melt. If the price of the melt is low as compared with that of the pigment, it is possible to dispense with the recovery thereof.

The method of recovering the final product which is technically more effective and more economical consists in that the melt discharging from the siphon of the through-flow container A is either led through special heating filters or is centrifuged, and the melt freed from the pigment is again supplied in a cycle to the container C.

The novel process is in principle suitable for the production of all inorganic pigments which formerly were subjected to a dry heating grain-ripening process. The process is consequently to be employed particularly for the production of zinc white, lithopones, zinc sulphide, cadmium-oxide, titanium oxide, iron oxide, chromium oxide and cobalt colours.

The crude colours can be subjected to the novel process either separately or in blended form. Whereas it was frequently advantageous for the blending agent to be heat-treated concurrently when using the prior dry heating process, in order that a better colouring power could be produced than with the subsequent blending of the pure heat-treated colours owing to the smaller degree of agglomeration of the pigment carrier resulting therefrom, it is occasionally desirable when using the novel process, for the pure pigments alone to be subjected to the heat treatment and for these to be mixed with the required blending agent subsequently.

To produce the best possible pigment properties, the structure of the precipitated crude colours is of great importance when using the novel process. Generally speaking, attempts should be made by using special precipitation or other formation conditions to ensure that the crude colours are of very fine grain.

A considerable number of inorganic compounds are in principle suitable for the preparation of the melt baths. Inter alia, alkali metal and alkaline earth metal halides or mixtures of alkali metal and alkaline earth metal halides, and sometimes also caustic alkalis or mixtures of caustic alkalis and the said halides, have proved to be very suitable.

The introduction of the inexpensive common salt is particularly economical; a lowering of the melting point (800° C.) of sodium chloride by the addition of other salts is advantageous from a technical point of view.

The ratio by weight between pigment and salt melt can be varied within wide limits. Generally, it is advisable to select such a ratio that 3–4 parts by weight of melt are used to 1 part by weight of pigment.

The temperature and the period of time of the heat treatment may be varied. Usually a temperature between 300° and 800° C. for a period of time between three minutes and three hours is satisfactory to produce a grain-ripened pigment.

The invention is further illustrated by the following examples without being restricted thereto.

Example 1

560 cc. of a solution containing 252 g. of $CdSO_4$/l. and 135 g. of $Cd(NO_3)_2$/l. is reacted at a temperature of 30° C. with a sodium carbonate solution containing 100 g. of $Na_2CO_3$/l. to form $CdCO_3$. A sodium sulphide-selenium solution at a temperature of 65° C. is added to the decanted carbonate slurry while constantly stirring, the said solution having been prepared by dissolving 101 g. of 60% sodium sulphide and 23.5 g. of selenium in 1 litre of water.

The cadmium sulphoselenide precipitate, which was kept for 2 hours at a temperature of 65° C. is filtered with suction, washed and dried.

The crude colour thus obtained is quickly introduced into 530 g. of a salt melt consisting of 230 g. of LiCl and 300 g. of KCl, in a quartz crucible while stirring vigorously and at a temperature of 450° C. and the melt is poured after 4 minutes into a vessel filled with water. After repeated decanting, the pigment suspension is filtered off and the precipitate washed and dried. 132 g. of a medium red having excellent brilliancy and colouring power are obtained.

Example 2

The crude cadmium colour prepared according to Example 1 is quickly introduced at a temperature of 400° C. and while stirring constantly, into 450 g. of a melt which consists of 330 g. of caustic soda and 120 g. of NaCl in an iron crucible, and the melt is poured after 5 minutes into a vessel filled with water. After decanting several times, the pigment suspension is filtered off and the precipitate washed and dried. 130 g. of a medium red having excellent brilliance and colouring power are obtained.

Example 3

From 1 litre of a solution containing 150 g. of $ZnCl_2$ and 69 g. of $ZnSO_4$, a 60% crude lithopone is precipitated while stirring well and at a temperature of 60° C. by adding a hot barium sulphide solution containing 200 g. of BaS per litre, so that it contains a slight excess of BaS. The crude colour is filtered off after 1 hour, washed and dried.

This crude lithopone is introduced while stirring vigorously and at a temperature of 550° C. into 850 g. of a melt consisting of 370 g. of LiCl and 480 g. of KCl in a quartz crucible, and the melt is poured after 40 minutes into a vessel filled with water. After decanting several times, the pigment suspension is filtered off and the precipitate is washed and dried. 240 g. of a 60% lithopone having excellent colouring power are obtained.

Example 4

100 g. of meta-titanic acid are introduced at a temperature of 650° C. and while stirring vigorously into 400 g. of a melt consisting of 175 g. of LiCl and 225 g. of KCl in a quartz crucible, and the melt is poured after 2 hours into a vessel filled with water; after repeated decanting, the pigment suspension is filtered off and the precipitate washed and dried.

80 g. of a titanium white with excellent colouring power are obtained.

I claim:

1. In a process for producing inorganic pigments of the group consisting of zinc oxide, zinc sulfide, lithopone, cadmium sulfide, titanium oxide, iron oxide, chromium oxide and cobalt pigments, which inorganic pigments require a grain-ripening treatment of the crude pigment by a heat treatment, the step which consists of suspending said crude pigment in a melt consisting of at least one inorganic compound selected from the group consisting of alkali metal halides, alkaline earth metal halides, caustic alkalis and mixtures thereof, for the required heat treatment at a temperature of between 300 and 800° C. for a period of from 3 minutes to 3 hours.

2. In a process for producing cadmium sulfoselenide pigments wherein a grain-ripening treatment of the crude pigment by a heat treatment is required, the step which consists of suspending the crude pigment in a melt consisting of at least one inorganic compound selected from the group consisting of alkali metal halides, alkaline earth metal halides, caustic alkalis and mixtures thereof, for the required heat treatment at a temperature of between 300 and 800° C. for a period of from 3 minutes to 3 hours, and recovering a cadmium sulfoselenide pigment of excellent brilliancy and coloring power upon removing said melt.

3. In a process for producing lithopone, wherein a grain-ripening treatment of the crude pigment by a heat treatment is required, the step which consists of suspending the crude pigment in a melt consisting of at least one inorganic compound selected from the group consisting of alkali metal halides, alkaline earth metal halides, caustic alkalis and mixtures thereof, for the required heat treatment at a temperature of between 300 and 800° C. for a period of from 3 minutes to 3 hours, and recovering a lithopone pigment of excellent brilliancy and coloring power upon removing said melt.

4. In a process for producing titanium oxide pigment wherein a grain-ripening treatment of the crude pigment by a heat treatment is required, the step which consists of suspending the crude pigment in a melt consisting of at least one inorganic compound selected from the group consisting of alkali metal halides, alkaline earth metal halides, caustic alkalis and mixtures thereof, for the required heat treatment at a temperature of between 300 and 800° C. for a period of from 3 minutes to 3 hours, and recovering a titanium oxide pigment of excellent brilliancy and coloring power upon removing said melt.

5. The process according to claim 1 in which said melt is in amount between three and four parts by weight per part by weight of the pigment used.

References Cited in the file of this patent

UNITED STATES PATENTS

| | | |
|---|---|---|
| 2,048,593 | Booth | July 21, 1936 |
| 2,218,655 | Peterson | Oct. 22, 1940 |
| 2,248,632 | Koller | July 8, 1941 |
| 2,263,656 | Stutz | Nov. 25, 1941 |
| 2,474,674 | Holden | Sept. 4, 1944 |
| 2,482,006 | Kertesz | Sept. 13, 1949 |
| 2,803,519 | Karan | Aug. 20, 1957 |
| 2,852,400 | Remeika | Sept. 16, 1958 |

FOREIGN PATENTS

| | | |
|---|---|---|
| 744,396 | Great Britain | Feb. 8, 1956 |